Sept. 30, 1952  P. T. ANGELL ET AL  2,612,082

IMPELLER BLADE SUPPORT FIXTURE

Filed March 31, 1948  2 SHEETS—SHEET 1

Inventors
Pierce T. Angell &
Carl J. Leska by  The Firm of Charles W. Hills  Attys

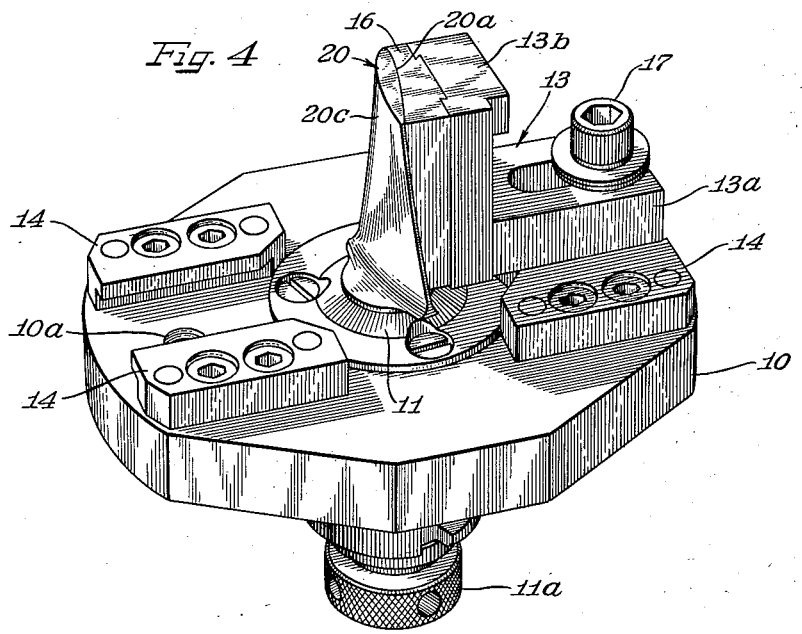
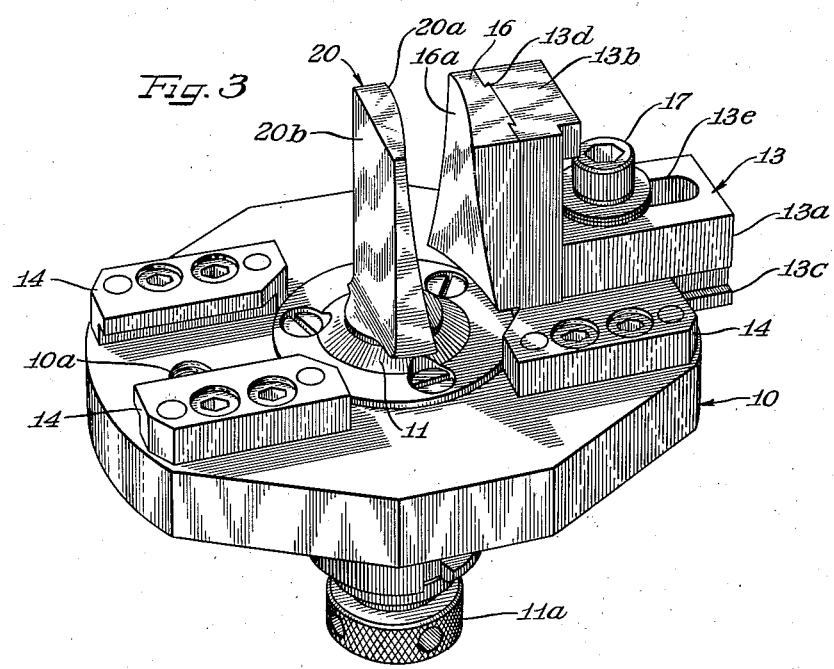
Inventors
Pierce T. Angell &
Carl J. Leska

Patented Sept. 30, 1952

2,612,082

UNITED STATES PATENT OFFICE 2,612,082

IMPELLER BLADE SUPPORT FIXTURE

Pierce T. Angell and Carl J. Leska, Cleveland, Ohio, assignors to Thompson Products, Inc., Cleveland, Ohio, a corporation of Ohio Application March 31, 1948, Serial No. 18,134

9 Claims. (Cl. 90—59)

This invention relates to an improved work supporting fixture for machining operations, and particularly to a novel method of fabricating a work supporting fixture for workpieces of complicated configuration.

In recent years, adequate machine tools have been developed for effecting the fabrication of complex shapes such as the blades or vanes of an impeller wheel by automatic milling or grinding operations. As is well known, in the larger sizes of impeller wheels, it is desirable that such wheels not be integrally formed but rather be formed by assemblage of a plurality of blade or vane elements to a mounting hub portion. While the existing machine tools will readily operate on a blank to fabricate an individual blade element, so far as developing the necessary relative movements between the rotating cutter and the workpiece blank is concerned, the fabrication of such individual impeller blades by milling or grinding operations has been heretofore seriously handicapped due to the difficulty of providing adequate support for the blade during certain stages of the milling operation.

The term "impeller blade" is used herein in a generic sense and is intended to include any fluid guide vane, including, of course, compressor blades, turbine buckets, and nozzle vanes.

Impeller blades are inherently of thin, deformable construction and, of course, the active surfaces of such blades are necessarily of very complex configuration in order to achieve optimum adiabatic efficiency. Since a mounting element in the form of a threaded stud or a dove-tailed projection is provided only at one end of the blade, it was therefore only possible to support the blade in a conventional machine tool fixture by such mounting element. Due to this type of cantilever support, the general geometry of the blade, and the fact that such blades are commonly formed from aluminum, magnesium or alloys of such light metals, it has been imperative that substantial lateral support be imparted to one face of the blade during machining operations on the other face. Obviously, when starting with a generally rectangular blank, no difficulty will be encountered in providing such support during the milling or grinding operation by which one of the complex blade surfaces is formed. However, when it becomes time to machine the opposite face of the blade, then substantial difficulties in adequately supporting the blade during such machining operation are encountered. The geometry and material of the blade makes it sufficiently flexible that substantial inaccuracy in the formation of the second blade surface will result, unless rigid support is provided for substantially all of the blade surface opposed to that being machined.

Accordingly, it is an object of this invention to provide an improved fixture for supporting a complex workpiece during machining operations, and particularly, to provide an improved method for fabricating such fixture.

A particular object of this invention is to provide a rapid and economical method for fabricating a work supporting fixture capable of providing overall surface support to a complex surface of a workpiece such as the vane surface of a partially machined impeller blade.

A particular object of this invention is to provide a method of fabricating a machine tool fixture for accurately supporting a complex surface of successive workpieces by casting of a low melting temperature material into a space defined on the work supporting block between a rigid backing element secured to such block and a master workpiece having a contour corresponding to that on the workpiece which the fixture is required to support.

Still another object of the invention is to provide an improved method for machining a complex workpiece, such as an impeller blade.

The specific nature of the invention, as well as other objects and advantages thereof will become apparent to those skilled in the art from the following detailed description of the annexed sheets of drawings which, by way of preferred example only, illustrate one specific embodiment of the invention.

Figure 3 is a perspective view of a completed work supporting fixture embodying this invention illustrating the manner of cooperation of such fixture with the complex surface of a partially machined workpiece; and Figure 4 is a view similar to Figure 3 but illustrating the position of the work supporting fixture embodying this invention during the final machining operation on the workpiece.

As shown on the drawings:

Figure 1:
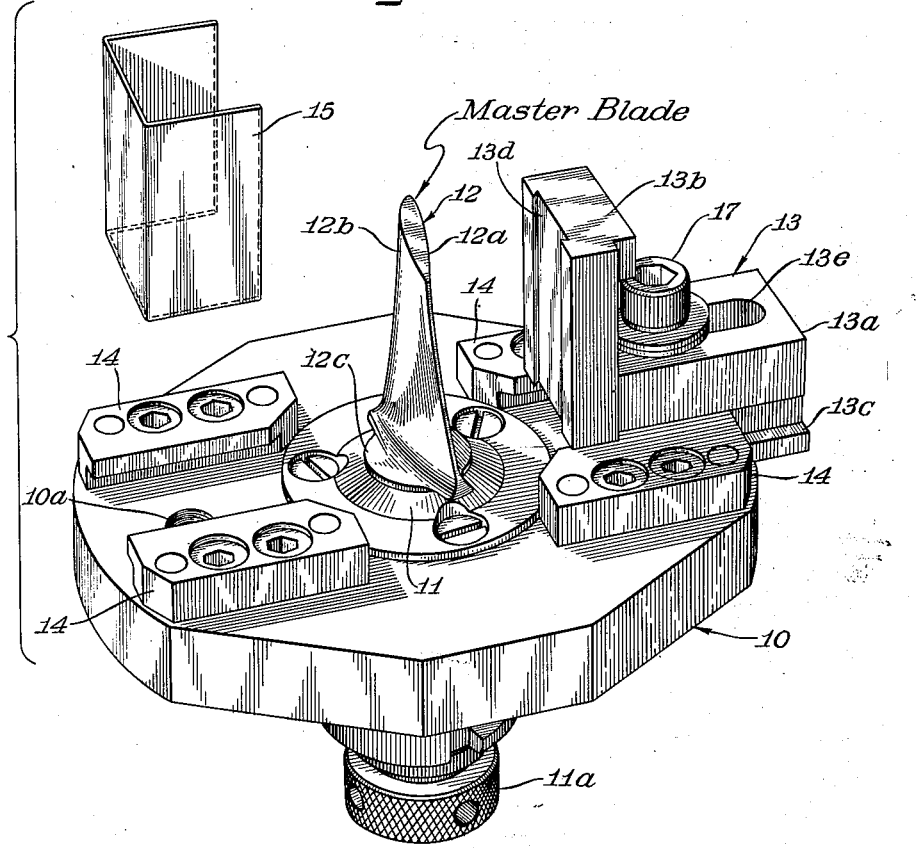
Figure 1 is a perspective view, illustrating a conventional work supporting fixture for a machine tool and the various elements required to produce a work fixing according to the methods of this invention, including a backing element, a master workpiece and a dam member.
Figure 2:
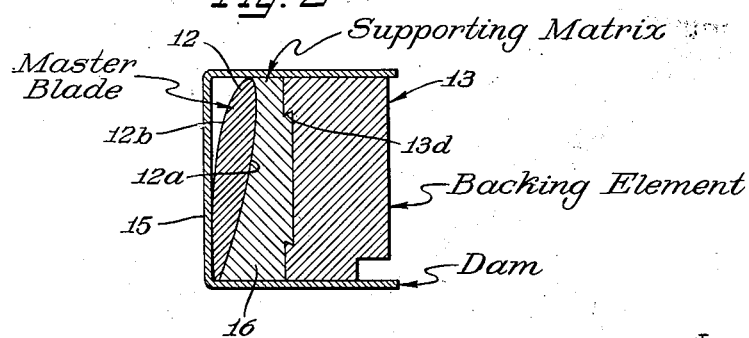
Figure 2 is a horizontal sectional view illustrating the relationship of the backing element, the master plate and dam during the casting operation.

As the description proceeds, it will be apparent to those skilled in the art that the principles of this invention are applicable to many other types of workpieces other than the specific example of an impeller blade herein described. Furthermore, the invention is independent of the particular construction of the work support block or primary work holder upon which a fixture embodying this invention is fabricated.

The invention will be particularly described and illustrated in connection with the formation of a work engaging support upon a machine tool work holder of a well known type which comprises a block element 10 in which is centrally mounted a chuck unit 11 which in this example is of the type permitting a cylindrical or threaded shank portion of the workpiece to be clampingly engaged and the workpiece thus supported in cantilever relationship with respect to the support block 10. Since the chuck 11 is of conventional construction, the elements thereof will not be described in detail, except to point out that the jaws of the chuck may be manually released or engaged with the cylindrical or threaded shank portion of the workpiece by actuation of the knurled knob portion 11a.

As previously mentioned, for exemplary purposes the invention will be described in connection with the fabrication of a work supporting fixture for an impeller blade. As the first step of the method embodying this invention, a master impeller blade 12 is provided. Such blade is of well known construction, having opposed complex vane surfaces 12a and 12b and a cylindrical, threaded shank portion 12c which is rigidly engaged and supported by the chuck 11. For the purposes of this invention, it is only necessary that one of the complex surfaces of the master blade, for example, the vane surface 12a, be accurately formed to conform to the machined configuration of similar surfaces on the various vane workpieces which are to be supported in the fixture.

It should be distinctly understood that the invention is independent of the configuration of the mounting shank portion of the blade. Actually, the chucking device 11 may be such as to incorporate any root fastening means, such as a dovetail, hinge joint or fir tree.

As a second step in the method of this invention, a rigid backing element is adjustably secured to the support block 10 with a portion thereof disposed in spaced, generally parallel relationship with respect to the master complex surface 12a. Such backing element may conveniently comprise an L-shaped member 13 which has projecting gibs 13c formed on one arm 13a thereof which are respectively slidably engaged in a radially extending slideway provided adjacent the face of support block 10 by the securement thereto of a pair of generally planar spaced guides 14. A similar pair of guide members 14 may be provided on block 10 in diametrically opposed relationship to accommodate the backing element 13 in the event that the opposite surface of the master blade, namely the vane surface 12b is to be utilized as the master complex surface. The other arm 13b of the backing element 13 is disposed in generally perpendicular relationship to the face of the support block 10 and hence extends in generally parallelism with the master complex surface 12a (as well as a plane passing through the master blade and generally parallel to the surfaces 12a and 12b).

The frontal generally planar face of the arm 13b, which is opposed to the master complex surface 12a, is recessed in any convenient manner, such as by the dovetailed recess 13d for a purpose that will be later described. The base arm 13a of the backing element 13 is further provided with an elongated slot 13e and a bolt 17 passing through such slot into a threaded hole 10a in the support block 10 permits the backing element 13 to be rigidly secured to the support block 10 in any desired radial position, and hence in any desired spacing with respect to the location of the master workpiece 12.

Next a dam member 15 is provided to cooperate with the master workpiece 12 and the backing element 13 so as to enclose the space defined therebetween. For exemplary purposes, the dam 15 is shown as comprising a U-shaped member of sheet material which is suitably dimensioned so as to surround both the upstanding arm 13b of the backing element 13 and the master workpiece 12.

When the dam is thus disposed, the space between the backing element and the master workpiece is completely filled by a casting operation wherein molten material of relatively low temperature melting point is poured into such space. The dam 15 functions, of course, to assist in confining the molten material to the space between the backing element and the master workpiece. The casting material 16 may comprise any one of several well known forms of low melting point materials which are solid at ambient temperatures. Preferably, it is preferred to employ a low melting point metallic alloy of the type that is commercially available and has melting point in the vicinity of 200° F. In any event, a solid matrix 16 of the low melting point material is thus formed to fill up the space between the backing element 13 and the master workpiece 12. By virtue of the dovetailed recess 13d formed in the front face of the backing element 13 such matrix is rigidly secured to the backing element.

Furthermore, the frontal face 16a (Figure 3) of the matrix 16 which abuts the master complex surface 12a of the master workpiece 12 will exactly conform to the configuration of such surface with a high degree of accuracy. Therefore, at the conclusion of the casting operation and after the molten material 16 has solidified, the ram 15 may be removed from block 10, as well as the master workpiece 12, whereupon the matrix 16 will appear as shown in Figure 3 with the exposed face 16a thereof conforming exactly to the master complex surface 12 of the master workpiece.

In the event that it is necessary to radially shift the backing element 13 in order to effect the removal of the master workpiece 12 from the support block 10, the slideway defined by the guides 14 insure that the backing element 13 may be positioned in exact relationship with respect to the axis of the chuck 11 as it previously occupied during the casting operation.

In the normal sequence of use of the support element including the matrix 16, a blade blank is employed having flat sides and a suitable root fastening projection thereon, and this blank is secured to the block 10 by insertion of the root fastening means in the chuck 11. A flat-sided fixture, for example, a fixture similar to the backing element 13 before the casting of the matrix 16 thereon, is mounted in one of the sets of guides 14 on the block 10 and engaged against one of the flat sides of the blade blank. Thereafter the exposed side of the blade is machined to its complex contour. In this manner, the complex surface may be machined to very close tolerances relative to the center of gravity of the root fastening means of the particular blade. Then, without removing the blade from the chuck 11, a supporting fixture including the backing element 13 and the matrix 16 is assembled in the opposite pair of guides 14 and the complex surface 16a of the matrix moved into engagement with the machined surface of the partly machined blade and the backing element 13 then locked in place by tightening of the bolt 17. The flat-sided support fixture is then removed from the block 10 and the remaining flat side of the partially finished impeller blade is then exposed for the next milling operation. This is the condition generally illustrated in Figure 3 of the drawings wherein is shown a partially machined workpiece 20 mounted in the chuck 11. As has been previously described, the backing element 13 is shifted radially inwardly from the position shown in Figure 3 to bring the exposed surface 16a of the matrix 16 into snug engagement with the complex surface 20a of the workpiece 20.

Hence, substantially all of the area of the complex surface 20a of the workpiece 20 is rigidly supported by abutment with the correspondingly shaped surface 16a of the matrix 16. Milling or grinding operations may then be performed on the unfinished surface 20b of the blade blank 20 to produce, with a high degree of accuracy, the finished complex contour 20c as illustrated in Figure 4. This contour can also be machined with a high degree of accuracy with respect to the center of gravity of the root fastening means of the blade.

In this connection, it should be pointed out that one of the most important requirements in machining these impeller blades is that the location of the center of gravity of each air foil section coincide within rather close limits with the center of gravity of the root fastening means of the blade. Since with the described method and apparatus, all of the machining operations on any particular blade may be accomplished while the blade is fixedly supported in the chuck 11, it is apparent that the complex surfaces thereon may be generated within very close tolerance limits with respect to the center of gravity of the root fastening means. Furthermore, the block 10 may be successively mounted on a plurality of milling or polishing machines without in any manner effecting the location of the blade with respect to its supporting fixture.

Obviously, the aforedescribed work fixture may thereafter be used for a large number of successive workpieces, and is subject to deterioration only through wear by successive engagement with the workpieces.

The improvement in accuracy of the machining of the second vane surface of impeller blades has been found to be quite substantial when a work supporting fixture constructed in accordance with this invention is employed. The fixture constructed in accordance with this invention has the further advantage of being extremely economical to fabricate, inasmuch as no machining operations are required and an entirely new fixture may be fabricated in the matter of minutes. Furthermore, each matrix 16 which is produced has unique advantages of being exactly positioned relative to the chuck 11, due to the locating effect of the guides 14 upon the backing element 13. Any support fixture manufactured by conventional milling and grinding operations would require, after such operations, an extremely precise locating of the complex supporting surface with respect to the chuck 11. Hence the methods of this invention result in unusual economies both in production and tooling costs.

It will, of course, be understood that various details in construction or procedure may be modified through a wide range without departing from the principles of this invention, and it is, therefore, not the purpose to limit the patent granted hereon otherwise than necessitated by the scope of the appended claims.

We claim:

1. The method of providing work support for machining operations on successive identical work pieces, the workpieces having at least one accurately formed surface thereon and a mounting portion at one end only thereof, which comprises rigidly securing the mounted portion of a master workpiece on a machine tool fixture in the machining location desired for the successive workpieces, providing a single rigid backing element on the machine tool fixture at one side only of the master workpiece and in spaced relation to the surface of the master workpiece corresponding to the accurately formed surface of the successive workpieces, providing a dam in surrounding relation to a space between said backing element and the master workpiece so that the only surface of the master workpiece that forms a boundary for such space is the accurately formed surface thereof facing said backing element, filling said space with molten, low melting temperature material which is solid at ambient temperatures, removing said dam and said master workpiece from the machine tool fixture, and successively and rigidly securing the mounting portions of workpieces to said fixture for support on said fixture in the place of the master workpiece, with the accurately formed surface of each workpiece engaged and supported by said low melting temperature material during machining operations thereon.

2. A machine tool fixture for supporting a thin, deformable workpiece having a complex surface opposite to the surface to be machined and a mounting portion at one end thereof comprising a work support block, a single rigid backing member secured to said block that is the sole support member for the workpiece that extends beyond said engaging means on said support block in the same direction the workpiece extends, a matrix of metal cast onto said backing member and having an exposed surface thereof molded to conform to said complex surface of the workpiece, and a chuck unit located centrally of said block for receiving said mounting portion of said workpiece to rigidly secure said workpiece to said block with the complex surface thereof abutting said molded surface of the matrix.

3. A machine tool fixture for supporting an impeller blade for machining operations on one face thereof, wherein the opposite face of the blade is of complex configuration and said blade has a mounting portion only at one end, comprising a support block, means on said support block for engaging said mounting portion of the blade to rigidly mount the blade thereon, a single rigid backing element that is the sole supporting member for the blade engagingly mounted on said support block that extends beyond said engaging means on said support block in the same direction the blade extends, a matrix of metal cast on to said backing element and having an exposed surface thereof molded to conform to said complex face of the blade, and means including a slideway aligned with said blade engaging means for adjustably securing said backing element to said support block, whereby said complex surface of the blade may be rigidly supported laterally solely by said molded surface of said matrix and vertically solely by said means engaging said mounting means.

4. A machine tool fixture for supporting an impeller blade for machining operations on one face thereof, wherein the opposite face of the blade is of complex configuration and said blade has a mounting portion only at one end, comprising a support block, means in the center of said support block for rigidly engaging said mounting portion of the blade, means on said support block defining a radially extending slideway, a rigid backing member slidably supported in said slideway, a matrix of metal cast on to said backing member and having an exposed surface thereof molded to conform to said complex surface of the blade, and means for adjustably securing said backing element to said support block, whereby said complex surface of the blade may be rigidly supported by the molded surface of said matrix.

5. The method of machining an impeller blade from a blank having opposed planar surfaces and root fastening means on one end thereof, which comprises rigidly attaching the blank to a machine tool fixture by the root fastening means, supporting one of said planar faces of the blank by a correspondingly shaped support member secured to the fixture while machining a complex surface on the opposed planar face, forming a complex surface on a second support element corresponding to the complex surface machined on the blank, securing the second support element to the work fixture with its complex surface in juxtaposition with the machined complex surface on the blank, and machining the remaining planar face of the blank to the desired complex surface, whereby the opposed complex surfaces produced on the blank may be accurately generated with respect to the center of gravity of the root fastening means of the impeller blade.

6. The method of supporting a partially machined impeller blade for additional machining operations, said blade having when finished an accurately machined complex airfoil section and a mounting portion in gravitational alignment with the airfoil section thereof, which comprises rigidly and detachably supporting a master impeller blade on a machine tool fixture by engagement of the blade mounting portion, providing a rigid backing element on said machine tool fixture at one side only of the master blade and in spaced relation to the surface of the master blade corresponding to the machined surface of the partially machined impeller blades, providing a dam in surrounding relation to a space between said backing element and the master blade, so as to exclude the surface of the master blade that faces away from said backing element, filling said space with molten, low melting temperature material which is solid at ambient temperatures, removing said dam and said master blade from the machine tool fixture, and rigidly mounting a partially machined blade on said fixture by engagement of the blade mounting portion, the blade airfoil section extending beyond the fixture in cantilever axial gravitational alignment with the rigidly engaged mounting portion so that the airfoil portion of the blade is supported laterally solely by the engagement of the machined surface of the blade with said low melting temperature material.

7. A machine tool fixture for supporting a thin, deformable workpiece having a complex surface opposite the surface to be machined, that comprises, as the sole support means for the workpiece, a support block having a generally planar face; a rigid backing element secured to said block and having a frontal generally planar face extending away from said block; a matrix of metal cast onto said backing element and having a frontal face molded to conform with the complex surface of the workpiece; and means on said block in front of the frontal face of said cast metal matrix for engaging and rigidly holding the workpiece at one of its ends to so position the workpiece that a plane passing through the workpiece generally parallel to the opposite surfaces thereof extends away from the planar face of said block and generally parallel to the frontal face of the backing element and in front of the frontal face of said metal matrix so that the complex surface of the workpiece abuts and is supported by the frontal face of said matrix and free access may be had to the opposite surface of the workpiece.

8. A machine tool fixture for supporting a thin, deformable workpiece having a complex surface opposite the surface to be machined, consisting of a support block having a generally planar face; a rigid backing element mounted on said block having a frontal generally planar face extending away from said block; a matrix of metal cast onto the frontal face of said backing element and having a frontal face molded to conform with the complex surface of the workpiece; a first means on said block in front of the frontal face of said matrix for engaging and rigidly holding the workpiece at one of its ends to so position the workpiece that a plane passing through the workpiece generally parallel to the opposite surfaces thereof extends away from the planar face of said block and generally parallel to the frontal face of said backing element and in front of the frontal face of said matrix; and adjustable means for securing said backing element to said block at a given distance from said first means along a line passing through said first means and generally normal to the frontal face of said backing element, so that the complex surface of the workpiece abuts and is supported by the frontal face of said matrix and free access may be had to the opposite surface of the workpiece.

9. A machine tool fixture for supporting an impeller blade for machining operations on one face thereof, the opposite face of the blade having a complex configuration, consisting of a support block having a generally planar face; a rigid backing element mounted on said block having a frontal generally planar face extending away from said block and normal to the planar face of said block; a matrix of metal cast onto said backing element having a frontal face molded to conform with the complex face of the blade; a first means in the center of said block and in front of the frontal face of said matrix for engaging and rigidly holding the blade at one end thereof to so position the blade that a plane passing through the blade and generally parallel to the opposite faces of the blade extends away from said block and normal to the planar face of said block and generally parallel to the frontal face of said backing element and in front of the frontal face of said matrix; and adjustable means for securing said backing element to said block at a given radial distance from said first means so that the complex face of the blade abuts and is supported by the frontal face of said matrix and free access may be had to the opposite face of the blade.

PIERCE T. ANGELL.
CARL J. LESKA.

REFERENCES CITED

The following references are of record in the file of this patent:

UNITED STATES PATENTS

| Number | Name | Date |
|---|---|---|
| 771,111 | Abate | Sept. 27, 1904 |
| 1,599,895 | John | Sept. 14, 1926 |
| 2,110,530 | Saines | Mar. 8, 1938 |

FOREIGN PATENTS

| Number | Country | Date |
|---|---|---|
| 535,905 | Germany | Oct. 16, 1931 |